(12) United States Patent
Battles et al.

(10) Patent No.: US 7,545,428 B2
(45) Date of Patent: Jun. 9, 2009

(54) SYSTEM AND METHOD FOR MANAGING DIGITAL IMAGES

(75) Inventors: Amy Battles, Windsor, CO (US); Miles K. Thorland, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1338 days.

(21) Appl. No.: 10/677,705

(22) Filed: Oct. 2, 2003

(65) Prior Publication Data

US 2005/0073601 A1   Apr. 7, 2005

(51) Int. Cl.
*H04N 5/222* (2006.01)
(52) U.S. Cl. .............................. 348/333.11; 348/333.12; 348/333.05
(58) Field of Classification Search ............ 348/333.05, 348/333.11, 333.12, 231.2; 715/400, 719–720
See application file for complete search history.

(56) References Cited

U.S. PATENT DOCUMENTS

| 6,249,316 | B1 * | 6/2001 | Anderson | ............... 348/333.05 |
| 7,196,727 | B2 * | 3/2007 | Sato | ....................... 348/333.11 |
| 2001/0030706 | A1 * | 10/2001 | Miller et al. | ........... 348/333.05 |

* cited by examiner

*Primary Examiner*—Tuan V Ho
*Assistant Examiner*—Selam T Gebriel

(57) ABSTRACT

A method of processing a plurality of digital images arranged in a preset order in a digital imaging device in response to user input includes determining a user scrolling direction in response to user scrolling inputs, at least partially deleting a displayed image in response to a user image deletion input, and based upon the determined scrolling direction, displaying at least a portion of the next image in the scrolling direction after the deleted image unless the deleted image was the first or last image in the preset order.

14 Claims, 3 Drawing Sheets

FIG. 1
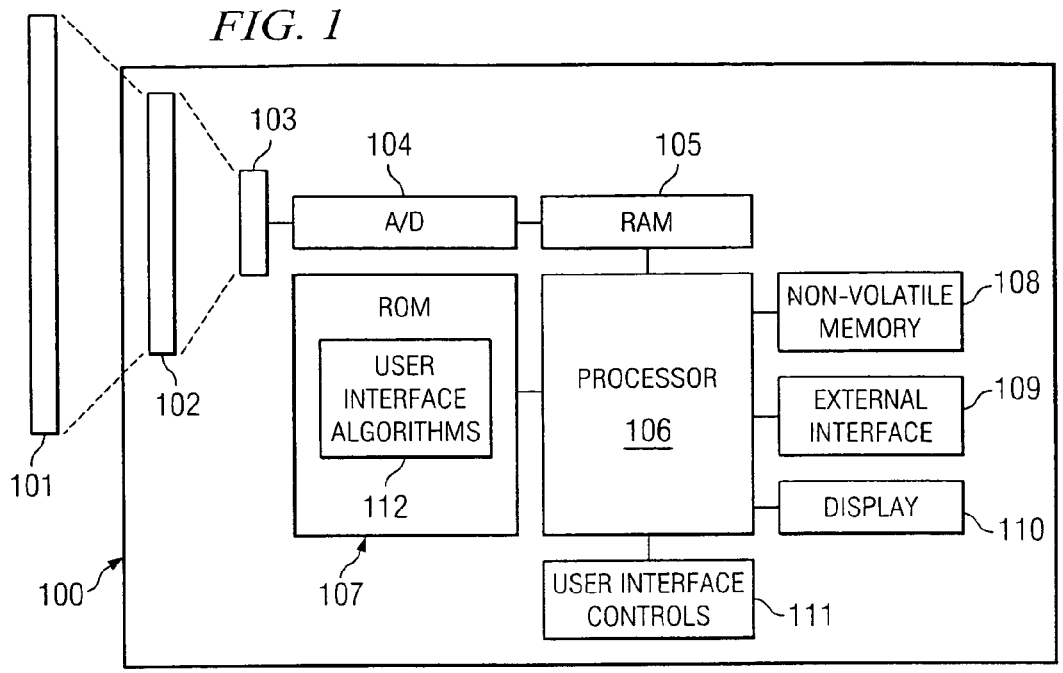
FIG. 2
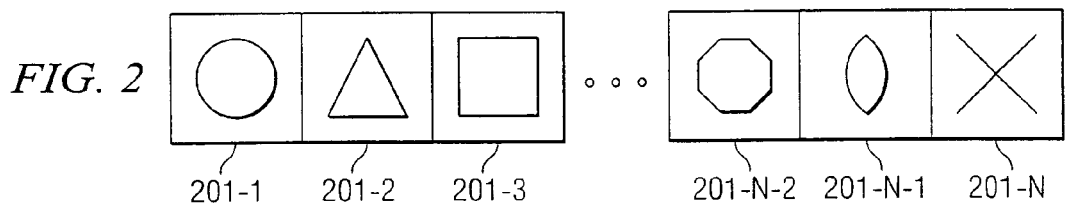
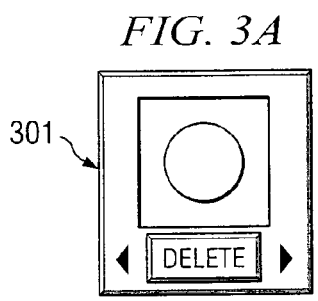
*FIG. 3A*
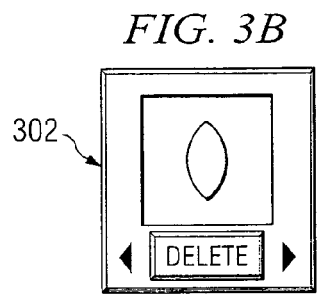
*FIG. 3B*
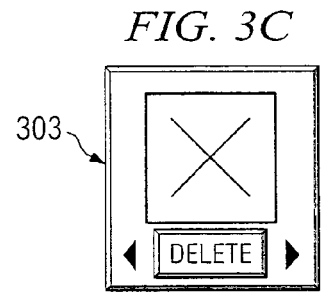
*FIG. 3C*
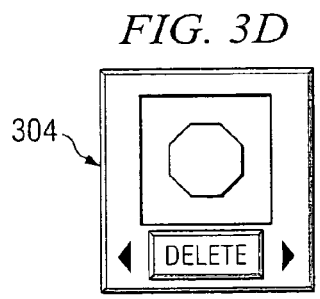
*FIG. 3D*
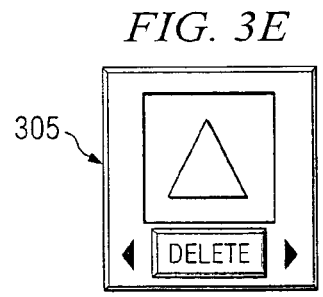
*FIG. 3E*
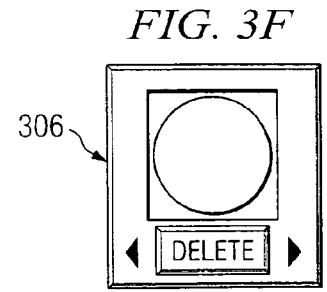
*FIG. 3F*

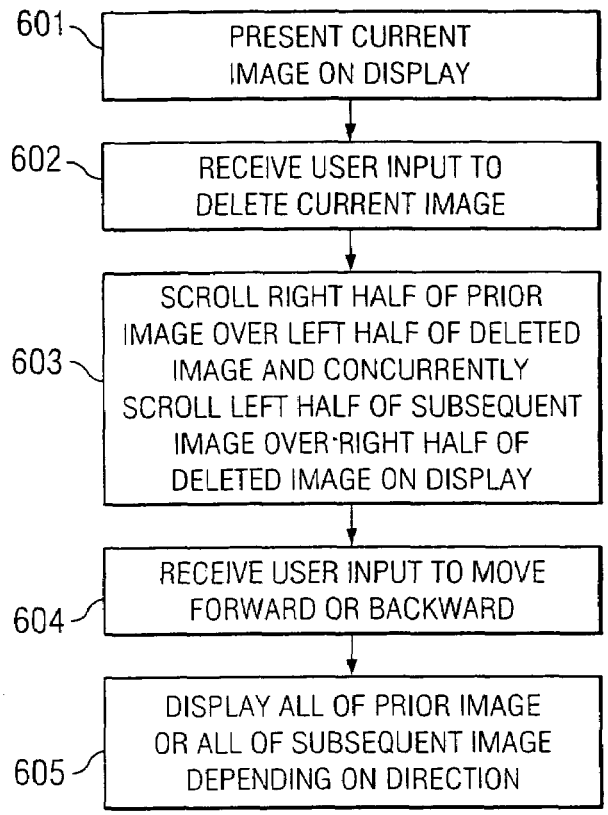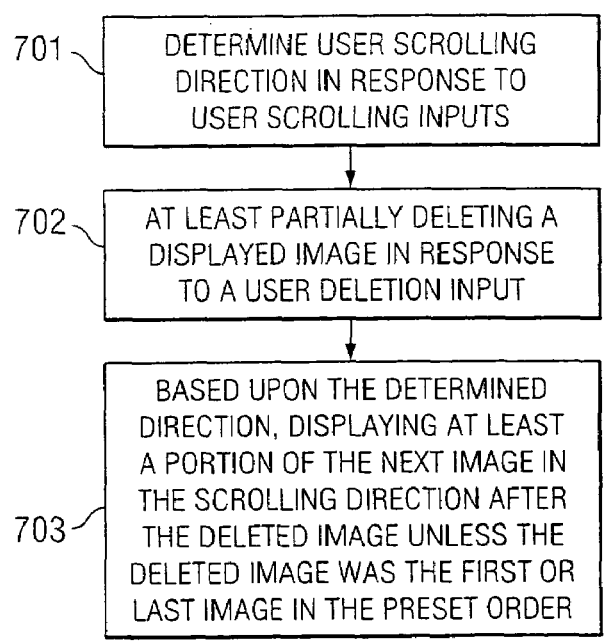

SYSTEM AND METHOD FOR MANAGING DIGITAL IMAGES

BACKGROUND

Digital cameras and other digital imaging devices typically present one or more images to a user, at least in part, via a display of such systems. In some systems, the images that are presented are arranged in a series, the order of the series corresponding to the order in which the images were stored on the system. One or more of the images of the series may be shown on the display at a given time. In addition to presenting the images to the user, the image viewing and editing system may also enable a user to delete one or more of the images from the series, as well as the system.

As part of the deletion of an image, an image viewing and editing system typically presents another image on the display. The particular image that is presented on the display and/or the manner in which the other image is presented may be a source of frustration and/or confusion to the user. For example, for existing image viewing and editing systems, once an image is deleted, the system presents the previous image in the series on the display, the previous image in this instance being the previous image in a backward direction with respect to the order of the series. This occurs after deletion of all images in the series, with the exception of the last image in the series.

Similarly, with existing image viewing and editing devices, when an image is deleted, the deleted image simply disappears from the display and is immediately replaced by the previous image in the series. This immediate disappearance of the image may be disorienting to the user. For instance, the user may be confused as to what happened to the image the user wanted to delete, whether the image was in fact deleted, and/or what image is now being presented to the user.

SUMMARY

A method enables a user to manage a plurality of digital images that are arranged in an order. The method comprises: receiving first user input to scroll through the plurality of digital images, presenting one of a subsequent image and a prior image of the plurality of digital images in response to the received first user input, maintaining a data structure that is indicative of a direction of traversal through the plurality of digital images, receiving second user input to delete a current one of the plurality of digital images, deleting the current one of the plurality of digital images, and presenting one of an image subsequent to the deleted one of the plurality of digital images and an image prior to the deleted one of the plurality of digital images depending on a value of the data structure.

BRIEF DESCRIPTION OF THE DRAWINGS

FIG. 1 depicts a digital camera that may implement a user interface for managing a plurality of digital images.

FIG. 2 depicts a plurality of digital images in an ordered arrangement.

FIGS. 3A-3G depict a plurality of screens associated with traversal and deletion of digital images.

FIG. 6 depicts another flowchart for managing a plurality of digital images.

FIG. 7 depicts another flowchart for managing a plurality of digital images.

DETAILED DESCRIPTION

Figure 4:
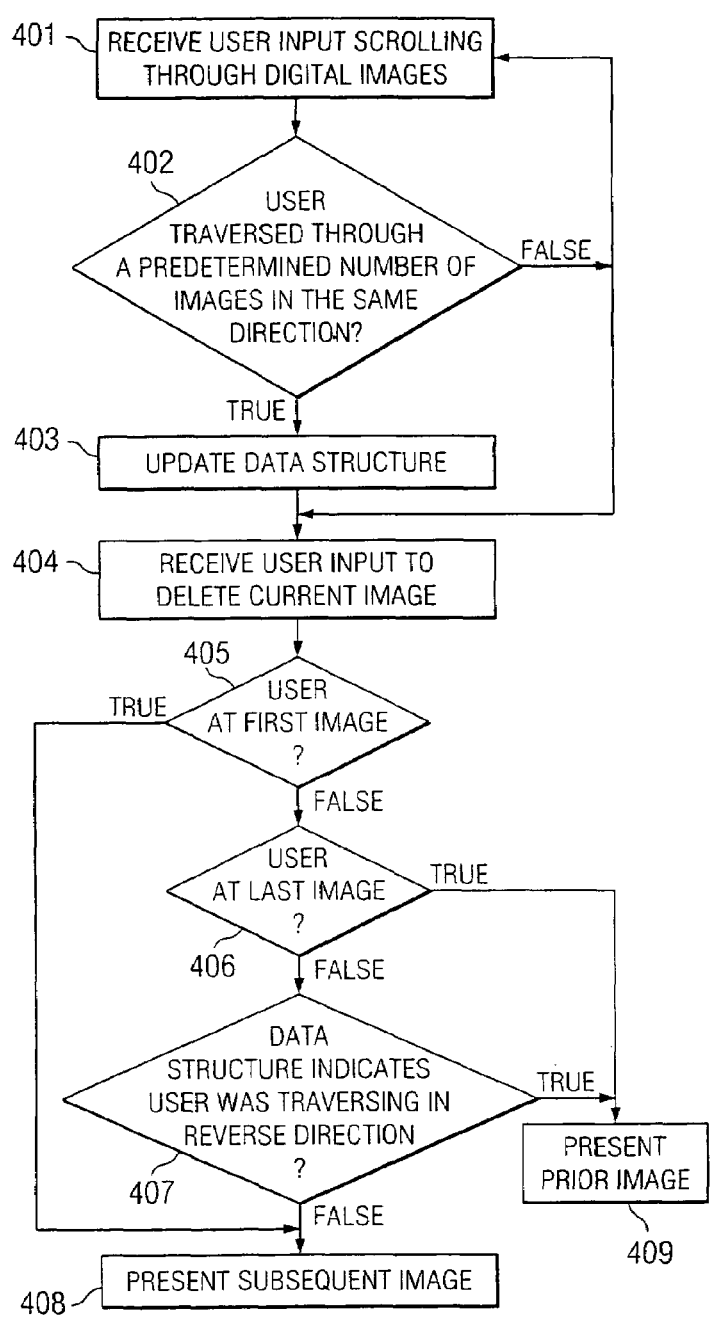
FIG. 4 depicts a flowchart for managing a plurality of digital images.

Referring now to the drawings, FIG. 1 depicts digital camera 100 that may implement a user interface for managing a plurality of digital images according to representative embodiments. Although representative embodiments are described in terms of a digital camera, the present invention is not so limited. The present invention may be implemented in association with any suitable digital imaging device. Digital camera 100 operates when light is reflected from object(s) 101 and is received by optical subsystem 102. Optical subsystem 102 optically reduces the image of object 101 to focus the image on an arrayed image capture device such as charge-coupled device (CCD) 103. CCD 103 is typically implemented as a two-dimensional array of photosensitive capacitive elements, generally referred to as picture elements or "pixels." When light is incident on the photosensitive elements of CCD 103, charge is trapped in a depletion region of each pixel. The amount of charge associated with the pixel is related to the intensity of light incident on the pixel during a sampling period.

The analog information produced by the photosensitive capacitive elements is converted to digital information by analog-to-digital (A/D) conversion unit 104. A/D conversion unit 104 may convert the analog information received from CCD 103 in either a serial or parallel manner. The converted digital information may be stored in an ordered array that is representative of the imaged object 101. It may be stored, for example, in internal memory 105 (e.g., random access memory). This storage of pixel information associated with an image of an object is sometimes referred to as "capturing" an image of the object. Capturing an image with a digital camera is roughly analogous to "taking a picture" through exposing film in a conventional camera. The digital information may be processed by processor 106 according to control software stored in ROM 107 (e.g., PROM, EPROM, EEPROM, and/or the like). For example, the digital information may be compressed according to the Joint Photographic Experts Group (JPEG) standard. Additionally or alternatively, other circuitry (not shown) may be utilized to process the captured image such as an application specific integrated circuit (ASIC). The processed digital information may be stored in non-volatile memory 108 (e.g., a flash memory card). The user may download digital images from non-volatile memory 108 to, for example, a personal computer using external interface 109.

In general, the storage capacity of non-volatile memory 108 is usually limited for a variety of reasons. Accordingly, it is occasionally appropriate for a user to delete selected digital images from non-volatile memory 108. The user may delete images that are substantial duplicates of other images, of relatively poor quality, old, previously downloaded to another system, and/or the like. To facilitate the management of digital images, digital camera 100 includes display 110 (e.g., a liquid crystal display) that may be utilized to present a digital image to the user. Display 110 is limited by the size of digital camera 100 and accordingly only one entire digital image of appreciable detail is typically presented on display 110 at any one time. User interface controls 111 (e.g., a touch screen, keys, and/or the like) may be utilized to traverse through the digital images stored in non-volatile memory 108. User interface controls 111 may also be utilized to delete selected ones of the digital images stored in non-volatile memory 108. User interface algorithms 112 may control how user input is processed to display and delete digital images stored in non-volatile memory 108 as will be discussed in greater detail below.

In representative embodiments, the digital images are stored in non-volatile memory 108 in an ordered manner. FIG. 2 illustrates a depiction of a plurality of digital images (shown as digital images 201-1 through 201-N) in an order linear manner. It shall be appreciated that the order of digital images 201-1 through 201-N does not require strict ordering in the physical portions of non-volatile memory 108. Instead, digital images 201-1 through 201-N may be stored in any suitable manner. The ordering may be implemented using an appropriate indexing or referencing scheme. To facilitate the discussion of representative embodiments, each of digital images 201-1 through 201-N is shown to represent a respective shape (a circle, a triangle, a square, an octagon, an ellipse, and an "X").

When a user initializes the user interface defined by user interface algorithms 112, the user may be presented with the first digital image 201-1 (i.e. the "circle") of the plurality of digital images as shown in screen 301 of FIG. 3A. The user may utilize an appropriate one of user interface controls 111 to scroll forward through the plurality of digital images to, for example, digital image 201-N–1 (the ellipse) as shown in screen 302 of FIG. 3B. Representative embodiments may advantageously maintain a suitable data structure (stored in RAM 105 or in a register) that indicates the direction of traversal through the digital images. The user may decide to delete digital image 201-N–1. Because the user was scrolling through the digital images in the "forward direction," the next digital image (image 201-N, the "X" shape) may be displayed as shown in screen 303 of FIG. 3C. The user may decide to delete digital image 201-N. In response, the user interface process may display digital image 201-N–2 (the octagon) as shown in screen 304 of FIG. 3D, because the deleted digital image 201-N is the last image in the plurality of digital images.

Figure 3G:
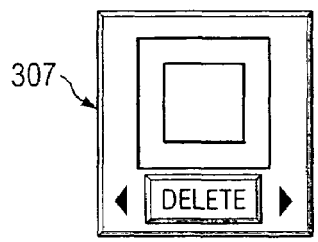

The user may then decide to scroll "backwards" through the remaining digital images to display digital image 201-2 (the triangle) as shown in screen 305 of FIG. 3E. Representative embodiments may advantageously update the data structure to reflect the direction of traversal through the digital images. The user may decide to delete digital image 201-2. In response, the user interface may present the digital image prior to digital image 201-2 (i.e., digital image 201-1, the circle) as shown in screen 306 of FIG. 3F, because the user had previously traversed backwards through the plurality of digital images. The user may then decide to delete digital image 201-1. Because digital image 201-1 is the first image, the user interface process may present the remaining subsequently digital image 201-3 (the square) as shown in screen 307 of FIG. 3G.

FIG. 4 depicts a flowchart for managing a plurality of digital images according to representative embodiments. The process flow of the flowchart may be implemented utilizing any number of logic implementations. For example, the process flow may be implemented utilizing suitable processor executable code stored in ROM 107 as part of user interface algorithms 112.

In step 401 of the flowchart shown in FIG. 4, user input is received to scroll though a plurality of digital images. In step 402, a logical determination is made to determine whether the user has traversed through a predetermined number of images (which could be one image if desired) in the same direction. If the logical determination is true, the process flow proceeds to step 403 where the data structure indicative of the direction of image traversal is updated. If the logical determination is false, the user may continue traversing images (step 401) or may delete the current image (step 404). When the current image is deleted, a logical determination is made to determine whether the current image is the first image (step 405). If true, the process flow proceeds to step 408 where the subsequent image is present on the display. If false, the process flow proceeds to step 406. In step 406, a logical determination is made to determine whether the current image is the last image. If true, the process flow proceeds to step 409 where the prior image is presented on the display. If false, the process flow proceeds to step 407 where a logical determination is made to determine whether the value of the data structure indicates that the user was traversing through the images in the reverse direction. If true, the process flow proceeds to step 409 where the prior image is presented on the display. If not, the process flow proceeds to step 408 where the subsequent image is presented on the display.

Figure 5A:
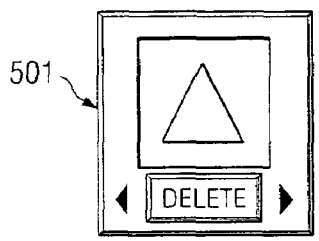
FIG. 5 depicts a plurality of screens associated with deletion of digital images.
Figure 5B:
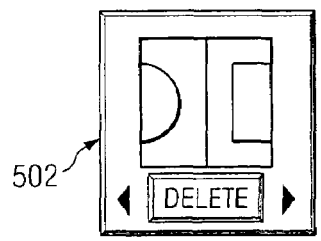

Other embodiments may display more than one digital image after the deletion of a digital image. Referring to FIG. 5A, suppose the user traverses through the digital images 201-1 through 201-N and arrives at digital image 201-2 as shown in screen 501 of FIG. 5A. If the user deletes digital image 201-2, a portion of the prior image (image 201-1, the circle) and a portion of the subsequent image (image 201-3, the square) may be presented on the display as shown in screen 502 of FIG. 5B. Moreover, to visually indicate the deletion of the image, an animation process may be utilized. For example, the right half of the previous image may be scrolled over the left half of the deleted image. Concurrently, the left half of the subsequent image may scrolled over the right half of the deleted image. This mechanism may be quite advantageous, when a number of images are almost identical. Specifically, if a new image merely replaced the deleted image, the similarity of the images may confuse the user who may not be certain whether an image was deleted or not.

As used herein in reference to the described embodiment of FIG. 2, the term "prior image" refers to the image to the immediate left of the current image and the term "subsequent" image refers to the image to the immediate right of the current image. Thus, if digital image 201-2 is the current image, then the "prior" image refers to digital image 201-1 and the "subsequent" image refers to digital image 201-3, regardless of the direction in which the images are being traversed. Of course, any predetermined ordering of images may be used in other embodiments with the terms "prior" image and "subsequent" image having meanings appropriate to that predetermined ordering independent of the current direction of traversal.

FIG. 6 depicts a flowchart for managing a plurality of digital images according to another representative embodiment. The process flow of the flowchart may be implemented utilizing any number of logic implementations. For example, the process flow may be implemented utilizing suitable processor executable code stored in ROM 107 as part of user interface algorithms 112.

In step 601 of the flowchart shown in FIG. 6, the current image is presented on the display. In step 602, user input to delete the current image is received. In step 603, the right half of the previous image is scrolled over the left half of the deleted image and concurrently the left half of the subsequent image is scrolled over the right half of the deleted image on the display. Alternatively, the image being deleted could be scaled in the horizontal direction as the portions of the previous image and the subsequent image are scrolled. Thereby, it may appear to the user as if the image being deleted is being "squeezed" by the other images. In step 604, user input is received to move forward or backward. In step 605, the entire prior image or subsequent image is displayed depending on the direction specified by the user. In alternative embodiments, steps 604 and 605 may be omitted. That is, the portions of the previous image and the subsequent image may be displayed temporarily. Then, one of the previous and subsequent images is displayed in full depending upon, for example, the user's previous direction of traversal through the images, without receiving any further user input.

FIG. 7 depicts another flowchart for managing a plurality of digital images that may be implemented utilizing suitable executable instructions stored in ROM 107 as part of user interface algorithms 112. In step 701, a user scrolling direction is determined in response to user scrolling inputs. In step 702, a digital image is at least partially deleted in response to a user deletion input. In step 703, at least a portion of the next image in the scrolling direction is displayed unless the deleted image was the first or last image in the preset order. If the displayed image is the first or last image in the preset order, the scrolling direction may be set to a new scrolling direction (either "forward" or "backward" as defined by the preset order). Then, at least a portion of the next image in the new scrolling direction after the deleted image is displayed.

Representative embodiments may provide a number of advantages. Representative embodiments may more accurately reflect user expectations. Specifically, when a user traverses through a large number of digital images and deletes one of those images, the user will most likely expect to view the next image in the direction that the user was traversing. Specifically, the user most likely is not interested in seeing an image that the user previously viewed moments ago. Accordingly, representative embodiments fulfill, rather than frustrate, user expectations. Thereby, the efficiency of the management of digital images is appreciably improved. Additionally, representative embodiments may provide the user a visual indication that the deletion of an image has actually occurred thereby improving the inexperienced user's ability to operate the user interface.

What is claimed is:

1. A method for providing a user interface algorithm to manage a plurality of digital images that are arranged in an order, comprising:
   presenting one of said digital images;
   receiving user input to delete said one of said plurality of digital images;
   deleting said one of said plurality of digital images in response to said user input; and
   concurrently presenting a portion of an image prior to said deleted one of said plurality of digital images and presenting a portion of an image subsequent to said deleted one of said plurality of digital images in place of presentation of said deleted one of said plurality of digital images.

2. The method of claim 1 further comprising:
   receiving second user input to scroll through said plurality of digital images; and
   presenting one of (i) all of said image prior to said deleted one of said plurality of digital images and (ii) all of said image subsequent to said deleted one of said plurality of digital images in response to said second user input.

3. The method of claim 1 further comprising:
   presenting one of (i) all of said image prior to said deleted one of said plurality of digital images and (ii) all of said image subsequent to said deleted one of said plurality of digital images after a predetermined amount of time.

4. The method of claim 1 wherein said concurrently presenting includes:
   scrolling said portion of said image prior to said deleted one over a first portion of said deleted one on a display; and
   scrolling said portion of said image subsequent to said deleted one over a second portion of said deleted one on said display.

5. The method of claim 4 further comprising:
   scaling said deleted one of said plurality of digital images while scrolling said portions of said image prior and said image subsequent over said deleted one.

6. The method of claim 1 wherein said presenting, receiving, deleting, and concurrently presenting are performed by a digital camera.

7. A digital imaging device, comprising:
   memory for storing a plurality of digital images that are arranged in an order;
   a display for displaying a digital image;
   a user input element for receiving user input; and
   a user interface process for managing said plurality of digital images responsive to said user input element, said user interface process including:
   code for presenting one of said digital images;
   code for receiving user input to delete said one of said plurality of digital images; and
   code for concurrently presenting, on said display, a portion of an image prior to said deleted one of said plurality of digital images and presenting, on said display, a portion of an image subsequent to said deleted one of said plurality of digital images in place of presentation of said deleted one of said plurality of digital images.

8. The digital imaging device of claim 7 wherein said user interface process further comprises:
   code for presenting one of (i) all of said image prior to said deleted one of said plurality of digital images and (ii) all of said image subsequent to said deleted one of said plurality of digital images in response to second user input after user input is received to delete said delete one of said plurality of digital images.

9. The digital imaging device of claim 7 further comprising:
   code for presenting one of (i) all of said image prior to said deleted one of said plurality of digital images and (ii) all of said image subsequent to said deleted one of said plurality of digital images after a predetermined amount of time.

10. The digital imaging device of claim 7 wherein said code for concurrently presenting comprises:
    code for scrolling said portion of said image prior to said deleted one over a first portion of said deleted one on a display; and
    code for scrolling said portion of said image subsequent to said deleted one over a second portion of said deleted one on said display.

11. The digital imaging device of claim 10 further comprising:
    code for scaling said deleted one of said plurality of digital images while scrolling said portions of said image prior and said image subsequent over said deleted one.

12. A method of processing a plurality of digital images arranged in a preset order in a digital imaging device in response to user input, comprising:
    a) determining a user scrolling direction in response to user scrolling inputs;
    b) at least partially deleting a displayed image in response to a user image deletion input;

c) based upon the determined scrolling direction, displaying at least a portion of the next image in the scrolling direction after the deleted image unless the deleted image was the first or last image in the preset order.

13. The method of claim 12 further comprising:

sensing whether the deleted image was the first or last image in the preset order;

if the deleted image was the first or last image in the preset order, reversing the scrolling direction from the sensed scrolling direction to a new scrolling direction; and displaying at least a portion of the next image in the new scrolling direction after the deleted image.

14. A system for processing a plurality of digital images arranged in a preset order in response to user input, comprising:

means for determining a user scrolling direction in response to user scrolling inputs;

means for deleting a displayed image in response to a user image deletion input;

means for displaying the next image after the deleted image according to the determined scrolling direction unless the deleted image was the first or last image in the preset order;

means for sensing whether the deleted image was the first or last image in the preset order; and means for reversing the scrolling direction from the sensed scrolling direction to a new scrolling direction and for displaying at least a portion of the next image after the deleted image according to the new scrolling direction, wherein said means for reversing and displaying is operable when said means for sensing senses that the deleted image was the first or last image in the present order.

* * * * *

UNITED STATES PATENT AND TRADEMARK OFFICE
CERTIFICATE OF CORRECTION

PATENT NO.        : 7,545,428 B2
APPLICATION NO.   : 10/677705
DATED             : June 9, 2009
INVENTOR(S)       : Amy E. Battles et al.

It is certified that error appears in the above-identified patent and that said Letters Patent is hereby corrected as shown below:

On the title page, in item (75), in "Inventors", in column 1, line 1,
delete "Amy Battles" and insert -- Amy E. Battles --, therefor.

In column 8, line 15, in Claim 14, delete "present" and insert -- preset --, therefor.

Signed and Sealed this

Third Day of November, 2009

David J. Kappos
*Director of the United States Patent and Trademark Office*